United States Patent [19]

Rion

[11] Patent Number: 4,505,877
[45] Date of Patent: Mar. 19, 1985

[54] DEVICE FOR REGULATING THE FLOW OF A FLUID

[75] Inventor: Jacky Rion, Pertuis, France

[73] Assignee: Commissariat a l'Energie Atomique, Paris, France

[21] Appl. No.: 351,215

[22] Filed: Feb. 22, 1982

[30] Foreign Application Priority Data

Feb. 26, 1981 [FR] France ............... 81 03835

[51] Int. Cl.³ .................................. G21C 1/04
[52] U.S. Cl. ............................ 376/352; 138/40; 138/42
[58] Field of Search ............. 376/352; 138/40, 46, 138/42, 43

[56] References Cited

U.S. PATENT DOCUMENTS

| | | | |
|---|---|---|---|
| 3,678,963 | 7/1972 | Betts | 138/41 |
| 3,892,625 | 7/1975 | Patterson | 376/352 |
| 4,036,690 | 7/1977 | Betts | 376/352 |

FOREIGN PATENT DOCUMENTS

| | | | |
|---|---|---|---|
| 2065744 | 8/1971 | France | 376/352 |
| 2296918 | 7/1976 | France | 376/352 |

Primary Examiner—Donald P. Walsh
Attorney, Agent, or Firm—Pearne, Gordon, Sessions, McCoy, Granger & Tilberry

[57] ABSTRACT

A device for regulating the flow of a fluid comprising a series of gratings positioned perpendicularly to the fluid flow, wherein it is formed by a stack of identical, contiguous gratings, whereof each is constituted by identical meshes forming a flat system, said meshes being staggered from one grating to the following contiguous grating, and wherein the mesh is formed by two adjacent equilateral triangles, one corresponding to an orifice and the other containing a crosspiece with three branches.

The invention also relates to a nuclear reactor fuel assembly incorporating such a device.

4 Claims, 5 Drawing Figures

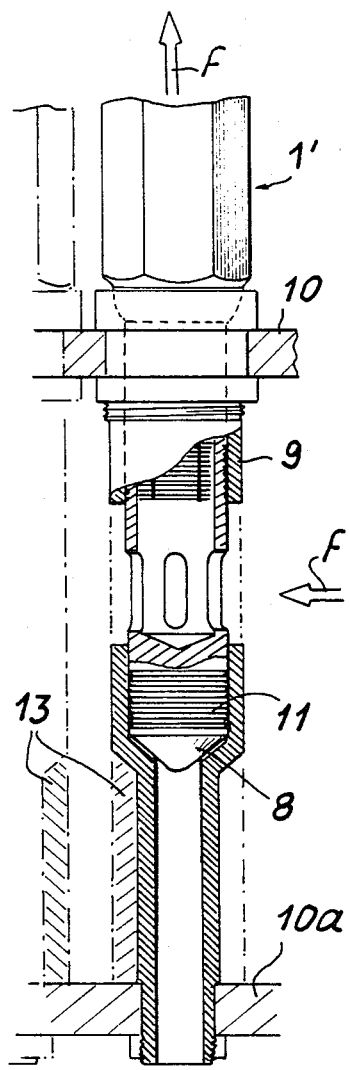
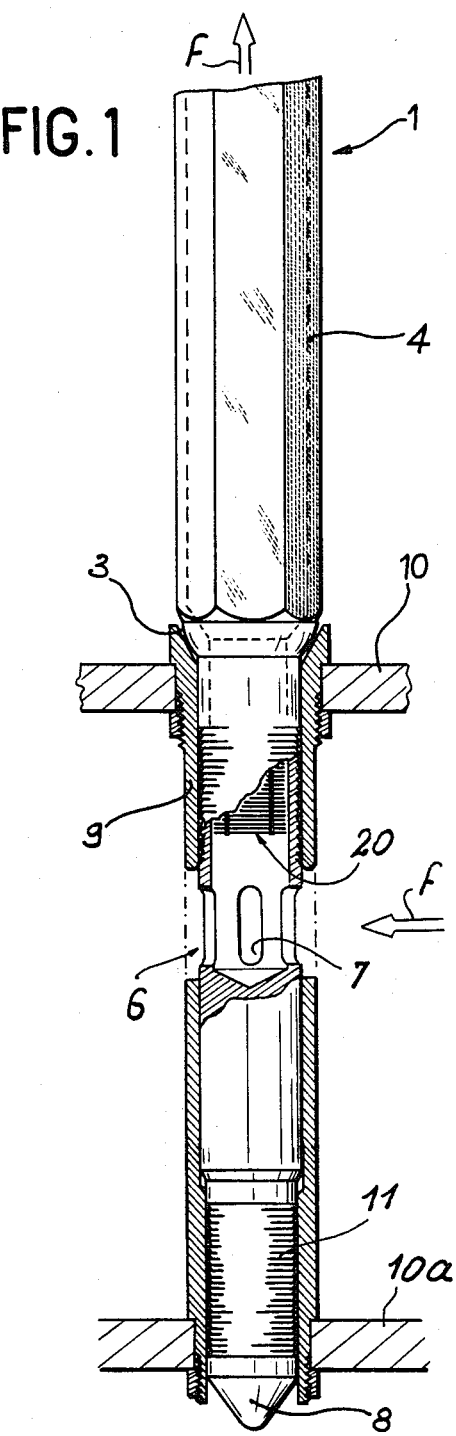

DEVICE FOR REGULATING THE FLOW OF A FLUID

BACKGROUND OF THE INVENTION

The present invention relates to a device for regulating the flow of a fluid.

In general terms the problem which is to be solved by the present device is to bring about a given pressure drop for a given nominal flow rate and a given downstream pressure, without producing cavitation.

This device is more particularly intended for use in the regulation of the flow of a cooling fluid circulating in the base of a liquid metal-cooled nuclear reactor assembly. It is known that the core of a nuclear reactor cooled by a liquid metal, generally formed by sodium comprises the juxtapositioning of vertically arranged assemblies, constituted in each case by an elongated case open at its upper end and provided at its lower end with a positioning support. These assemblies are conventionally supported by a rigid supporting member supplied by means of circulating pumps with liquid sodium from the heat exchangers.

In order to bring about an appropriate mechanical fixing of the assembly positioning support, it is fitted on to or into a carrying member integrated into the core supporting member. This carrying member also supplies the liquid sodium to the base of the assembly.

The flow rates of the cooling liquid sodium in these assemblies must be appropriately adjusted as a function of their position. Various devices installed in the carrying members or assembly bases are known, which make it possible to regulate the cooling fluid flow.

Thus, in the hitherto known fast neutron nuclear reactors, devices are conventionally used which consist of a stack of diaphragms having a central hole, annular orifices or multiple perforations, of the type described in French Pat. No. 7520819 of July 2, 1975 and French Pat. No. 7835201 of Dec. 14, 1978. These simply constructed devices lead to significant overall dimensions, whilst only giving reduced performance levels in connection with the cavitation.

Another device is described in French Pat. No. 2 065 744 filed on Oct. 21, 1970 and entitled "Device for regulating the flow of a liquid". This device has a series of thin barriers spaced in the flow direction, each barrier being constituted by a metal sheet cooperating with regulatable devices forming a mask and which are able to modify the effective surface presented to the liquid flow.

However, for high hydraulic energy dissipation levels, the mechanical strength of the metal sheets is not completely adequate. Moreover, such a design does not lead to an optimum radial compactness.

BRIEF SUMMARY OF THE INVENTION

The present invention relates to a cooling fluid flow regulating device, which obviates the aforementioned disadvantages. It makes it possible to provide a device which is more compact than the known devices, so that it is possible to reduce the height of the assembly base, whilst ensuring adequate performance levels with respect to the cavitation.

Another particularly interesting advantage of the flow regulating device according to the invention results from the fact that the installation of the grids or gratings is made easier because they are all identical to one another.

Finally, the numerous bearing points between the different gratings gives the thus formed structure a high mechanical strength and a good resistance to vibratory stresses due to the flow, whilst maintaining a high degree of porosity (exceeding 0.8).

More specifically the device according to the invention comprises a series of gratings perpendicular to the fluid flow.

It is constituted by identical superimposed gratings, whose patterns are arranged in accordance with an equilateral triangular system.

It is possible to draw a distinction between two complementary patterns centered on two adjacent equilateral triangles, one being an orifice having a variable shape and the other a crosspiece with three branches. The association of these two patterns forms the mesh of the grating.

By rotating by 60° or turning over, the orifice of one grating is superimposed by the crosspiece of the following grating. This arrangement forces the fluid to follow a winding path through the stack of gratings.

The desired pressure drop regulation is obtained by acting on the number of stacked gratings for a given mesh. It is also possible to more accurately adjust the value of this pressure drop by superimposing the orifices for a fraction of the gratings of the stack.

Finally the complete stack of gratings can be joined together, e.g. by pins traversing a certain number of contact points located at the apices of the equilateral triangles of the meshes.

BRIEF DESCRIPTION OF THE DRAWINGS

The invention is described in greater detail hereinafter relative to non-limitative embodiments, and with reference to the attached drawings, wherein show:

FIG. 1: a vertical sectional view of a fuel assembly incorporating a regulating device according to the invention.

FIG. 5: a vertical sectional view of a variant of the fuel assembly incorporating a device according to the invention.

DETAILED DESCRIPTION OF THE PREFERRED EMBODIMENTS

Figure 2:
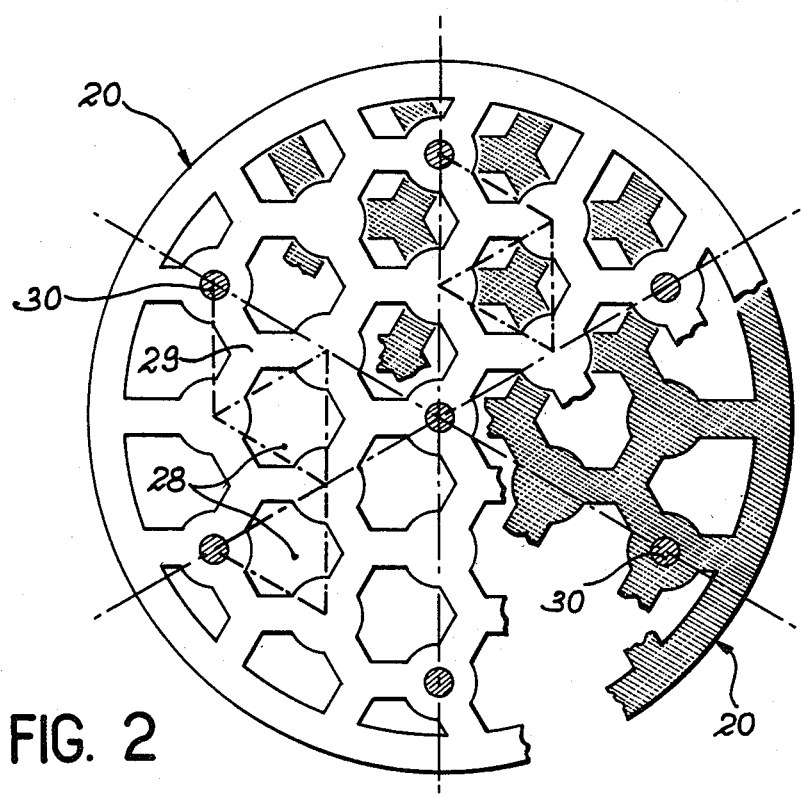
FIGS. 2 to 4: three different embodiments of the plates of the device of FIG. 1.

FIG. 1 is a vertical sectional view of a fuel assembly 1 incorporating a flow regulating device. This assembly is installed in the core of a fast neutron nuclear reactor cooled by a liquid metal. It has at its lower end a positioning support formed by a hollow cylindrical body 2 joined by a spherical bearing member 3 to an open case 4 arranged in the extension of the support. In its median portion, body 2 has an area 6 in which are provided oblong holes 7 regularly distributed about its axis and permitting the cooling liquid metal to circulate in the support whilst penetrating the latter by openings before flowing from bottom to top, firstly in body 2 and then in case 4, before leaving the latter through its open upper portion. At its lower end, body 2 is sealed by a plug 8 fixed to the support. Body 2 is held in its vertical position by engagement in a hollow piller 9 belonging to the supporting member 10 of the reactor core. The cooling liquid metal, forced back under pressure into supporting member 10, enters assembly 1 and flows from bottom to top therein.

According to the invention, the device is constituted by a series of identical grids or gratings 20, preferably made from stainless steel and positioned perpendicularly to the fluid flow.

Figure 3:
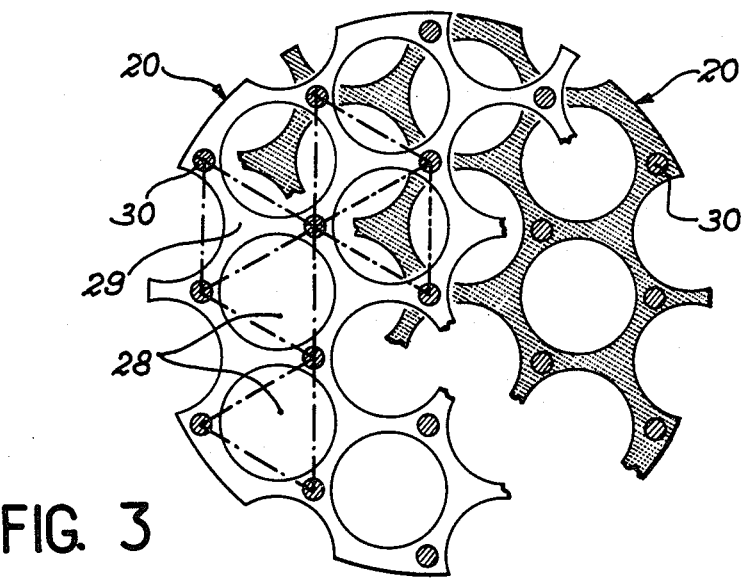
Figure 4:
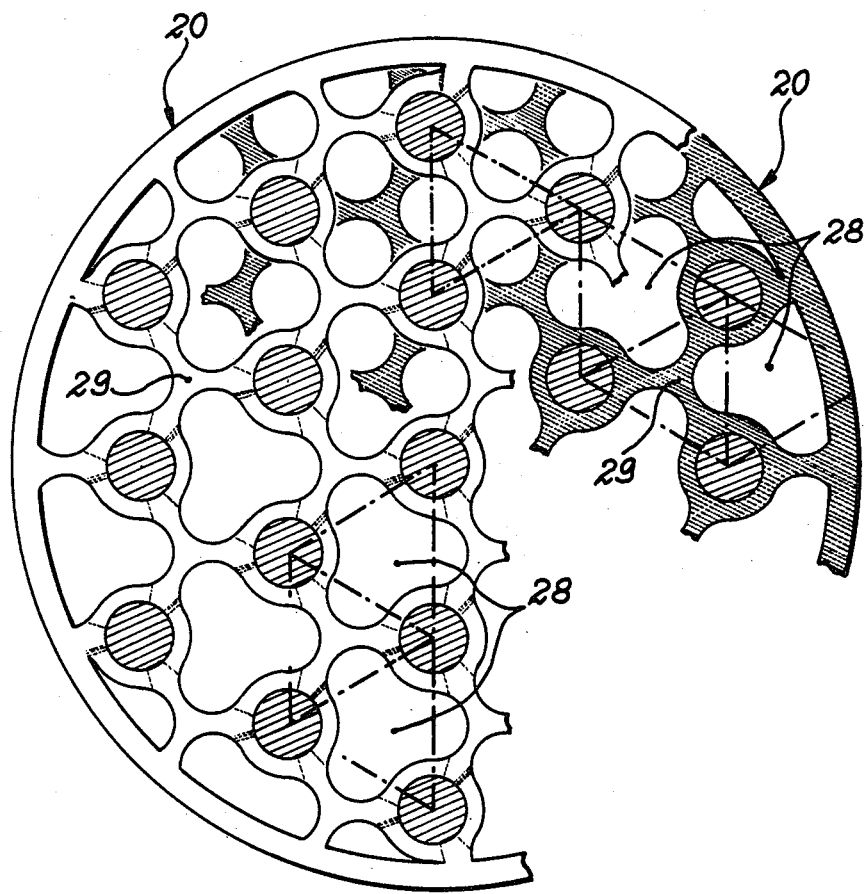

FIGS. 2 to 4 show three different embodiments of the gratings 20. The device comprises a series of gratings mounted in body 2 of the base of assembly 1. These gratings, which are all identical for a given embodiment, comprise a flat system with regular meshes, each being formed by two adjacent equilateral triangles, one corresponding to an orifice 28 and the other containing a crosspiece 29 having three branches. By rotating one grating by 60° with respect to the contiguous grating, the crosspiece 29 of the contiguous grating is superimposed on the orifice 28 of the first grating. This arrangement leads to a partial overlap of the orifices, forcing the fluid to follow a winding path through the stack of gratings 20.

In the case of the embodiments shown in FIGS. 2 to 4, it is possible to see a flat system of identical meshes, whereof each is constituted by two adjacent equilateral triangles 28, 29. On fitting, by rotating one grating by 60° with respect to the following grating, the crosspieces of the equilateral triangles 29 of one of the gratings are superimposed, with a partial overlap, on the orifices of the equilateral triangles 28.

After stacking all the gratings, the latter are axially joined by tie bolts traversing a certain number of the apices 30 of the equilateral triangles.

The passage cross-section available to the fluid is defined by the nominal flow rate of said fluid. The length of the device, i.e. the number of stacked plates, is defined by the pressure drop to be obtained. The careful choice of certain parameters makes it possible to minimize the volume of the device.

FIG. 3 is a variant of the device of FIG. 2. In this variant, the openings made in gratings 20 are circular. As in the case of the preceding embodiment, the stack of gratings is brought about after rotating one grating by 60° with respect to the preceding grating. The amount of opening is regulated by acting on the diameter of the openings. After superimposing the plates, in the manner shown in FIG. 3, the passage provided for the fluid is in the form of lenses or meniscus lenses.

The grating design of FIG. 4 is a more elaborate variant of the embodiment of FIG. 3. It leads to a better distribution of the material between the nodes and the crosspieces. As in the two previous cases, the stack is obtained by rotating one grating 20 with respect to the preceding grating. After fitting the plates, the passages left for the fluid are circular orifices.

FIG. 5 is a vertical sectional view of a fuel assembly 1' incorporating a cooling fluid flow regulating device according to the invention, the fluid circulating in the direction of arrows f. As stated hereinbefore, this device is more compact than prior art devices and it is possible to obtain an identical pressure drop with a lower height. Consequently it is possible to reduce the height of the base of the assembly, i.e. the height necessary for housing the flow regulating device, the oblong holes 7 and the lower labyrinth seal 11 for limiting the leakage flow of the liquid metal. Thus, the base of the assembly is partly engaged in the lower pillar 9. It is therefore possible to reduce the diameter of said pillar 9 below plug 8.

The advantages resulting from this construction are on the one hand a reduction of the pressure drops due to the pillars. The hatched area 13 represents the supplementary passage cross-section obtained by reducing the diameter of pillar 9. On the other hand the diameter of the fixing holes for these pillars in the lower plate 10a is smaller. This makes it possible to reduce the thickness of the plate or, for the same thickness, increase its strength.

The invention is obviously not limited to the embodiments described in represented herein and numerous variants are possible thereto without passing beyond the scope of the invention. Thus, it is possible to modify the geometrical shape of the orifices and the crosspieces of the mesh, as well as the geometrical shape of the periphery of the gratings, in order to adapt them to the pipe in which the flow rate of a fluid is to be regulated.

I claim:

1. A device for regulating the flow of a fluid, comprising a plurality of identical gratings stacked in contiguous relationship, each grating being a plate having a plurality of regularly spaced orifices, said orifices being distributed in adjacent equilateral triangular patterns, a first said pattern in which said orifice occupies substantially all of the surface of said equilateral triangle, a second said pattern including a three-branched crosspiece, said orifices of one grating being superimposed on said cross-pieces of a contiguous grating by rotating by 60 degrees or by turning over said one grating with respect to said contiguous grating, such that the fluid follows sinuous paths through the orifices of said stacked gratings.

2. A device according to claim 1, wherein the gratings are joined by tie bolts traversing the said gratings at a certain number of contact points located at the apices of the equilateral triangles of said patterns.

3. A nuclear reactor fuel assembly, wherein it comprises a device for regulating the flow of a heat transfer fluid constructed in accordance with claim 1.

4. A nuclear reactor fuel assembly according to claim 3, whose base is disposed in a hollow pillar, wherein the base of said assembly is partly engaged in the pillar, the latter having a diameter reduction in that portion where the assembly base is not engaged.

* * * * *